(12) United States Patent
Johnson (10) Patent No.: US 9,939,046 B2
(45) Date of Patent: Apr. 10, 2018

(54) CHAIN TRAP (71) Applicant: Joel Anthony Johnson, Beaverton, OR (US)

(72) Inventor: Joel Anthony Johnson, Beaverton, OR (US)

( * ) Notice: Subject to any disclaimer, the term of this patent is extended or adjusted under 35 U.S.C. 154(b) by 0 days.

(21) Appl. No.: 14/930,513

(22) Filed: Nov. 2, 2015

(65) Prior Publication Data
US 2017/0122406 A1 May 4, 2017

(51) Int. Cl.
A47F 5/00 (2006.01)
F16G 15/00 (2006.01)
F16M 13/02 (2006.01)
A63B 21/078 (2006.01)

(52) U.S. Cl.
CPC .......... *F16G 15/00* (2013.01); *A63B 21/0783* (2015.10); *F16M 13/02* (2013.01); *A63B 2225/093* (2013.01)

(58) Field of Classification Search
CPC ...... F16G 15/00; F16M 13/02; A63B 21/0783
See application file for complete search history.

(56) References Cited

U.S. PATENT DOCUMENTS

| 4,216,959 | A | * | 8/1980 | Niles | A63B 21/078 24/299 |
| 8,057,143 | B2 | * | 11/2011 | Adams | B60P 7/0815 296/184.1 |
| 2013/0240692 | A1 | * | 9/2013 | Lahey | F16M 13/02 248/205.1 |

* cited by examiner

*Primary Examiner* — Amy J. Sterling
(74) *Attorney, Agent, or Firm* — Mark S Hubert (57) ABSTRACT A chain catch that is capable of being attached to various bases so as to allow the quick and simple affixation of the chain catch to any vertical chain. The chain catch has an upper body and a lower body. The upper body is designed to trap a vertical chain within its internal design while it remains within its vertical orientation, and the lower body is designed to attach to a load and to the upper body. When the tension is taken off of the chain within the chain catch and the upper body is tilted, the chain may be vertically raised, free from the chain catch or the chain catch and its attached barbell can be vertically raised.

6 Claims, 8 Drawing Sheets

CHAIN TRAP

BACKGROUND OF THE INVENTION

The present invention relates to a extremely compact apparatus for locking onto a metal or alloy chain. It is adapted to provide both safety and convenience for the user. In a suggested usage the apparatus may be incorporated into a weightlifting apparatus that allows weightlifters to solely perform exercises with heavily weighted barbells moving primarily in the vertical plane, but unrestricted in any axis of movement so as to provide a safe and truly free-weight lifting environment. It allows the barbell to be "racked" in a secure configuration so as to function as a self-spotting device, able to take the load of the barbell from the lifter at will.

The American populace loves working out with weights. There has been a meteoric rise of small "boutique" personal training facilities in the last two years as the scientific study of weightlifting as applied to sports performance is big business now. However, many weightlifters still work out at home by themselves for a plethora of different reasons. While the commercial gyms and training facilities abound with safety mechanisms the personal gyms do not. Most safety mechanisms are incorporated into the larger pieces of expensive and professional equipment. Home gyms don't have the space to accommodate these spatial monstrosities, and thus lack these safety mechanisms.

Henceforth, an economical, safety system for weightlifters that can be engaged or disengaged by a sole weightlifter at multiple vertical positions would fulfill a long felt need in the weightlifting industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a chain trap that is capable of being attached to various bases and surfaces so as to allow the quick and simple connection of a chain of a linked construction.

It has many of the advantages mentioned heretofore and many novel features that result in a new chain trap which is not anticipated, rendered obvious, suggested, or even implied by any of the prior art, either alone or in any combination thereof.

In accordance with the invention, an object of the present invention is to provide an improved chain trap that is devoid of all moving parts and is capable of quick and secure affixation to a link of any compatibly sized chain.

It is another object of this invention to provide a device capable of locking onto any link of a chain and which may be configured for connection to a plethora of different surfaces, with a plethora of different connectors, for use in both the vertical plane, horizontal plane and there between.

It is still another object of this invention to provide an improved chain trap capable of locking or unlocking from a chain by a backward rotation of its body through an acute angle.

It is a further object of this invention to provide an improved chain trap that allows for the passage of chain through its body with a minimum generation of friction.

It is still a further object of this invention to provide for an improved chain trap than can be incorporated into a chain auto releasing device upon the coupling of an alternate embodiment connecting member.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

DETAILED DESCRIPTION

As used herein, the term "chain" refers to a connected flexible series of links or rings (generally metal or steel) passing through one another, and used for fastening or securing objects and pulling or supporting loads.

As used herein, the term "of a matingly conforming size" with respect to a chain for use with the chain trap, refers to a chain having individual links or rings that are sized for passage through the ovate opening of the chain trap's body, while the link or ring size prevents all adjacent links or rings (which are disposed generally perpendicular to all other adjacent links) from passage through the ovate opening. Stated in other terms, the chain has a thickness lesser than the width of the ovate opening but a width (the side to side measurement of the adjacent link or ring) that is greater than the width of the ovate opening.

As used herein, the term "unitary" refers to a one piece device or unit. Although it may be comprised of separate elements permanently affixed together. They are affixed in such a fashion that they cannot be separated from the whole device or unit without destroying the device or unit or rendering it inoperable.

The present invention is designed to operate in both the vertical and horizontal planes (and angles there between) depending from which direction the chain exerts its force. Discussion of its structure and operation will herein refer to the linear axis of the body residing in the vertical plane and the chains also residing in the vertical plane. Generally, the load the device supports will be moved in the vertical plane. Although discussed as a chain trap the disclosed apparatus will also work with a knotted rope.

Looking at FIGS. 3-9 it can best be seen that the preferred embodiment chain trap 2 is comprised of a chain trap body 4 and a pair of connecting members 6. The body 4 is a unitary housing having a first side 12 and a second side 14 that are held in a generally parallel, vertical configuration by a generally horizontal chain guide 10 and a shoulder 16. Preferably the chain guide is circular in cross section to allow the ease of passage of the chain links or rings by it. The shoulder 16 lies at an acute angle between the horizontal and vertical planes. (Preferably this angle is 50 degrees with respect to the horizontal plane although this angle may vary from 40 to 60 degrees.) On the body, the edges (interface) where the shoulder 16 meets the sides 12 and 14, on both the outer surfaces and the inner surfaces of the body 4, are rounded (radiused). For the purposes of strength, the body is made as a unitary piece with no moving or detachable parts. It may be fabricated by casting, machining or welding and will be made of a strong yet not brittle metal, steel or alloy, although high strength polymers may be suitable for certain applications.

Figure 4:
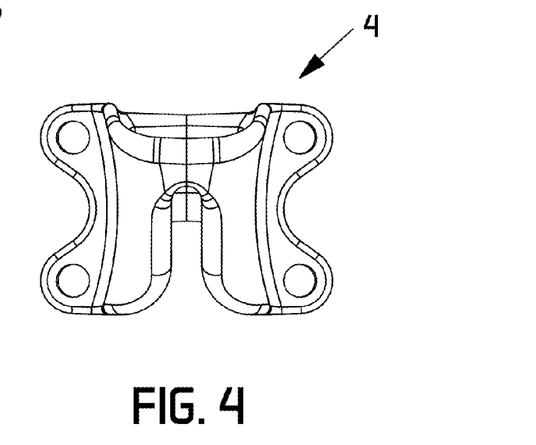
FIG. 4 is a top view of the body of the chain trap.
Figure 5:
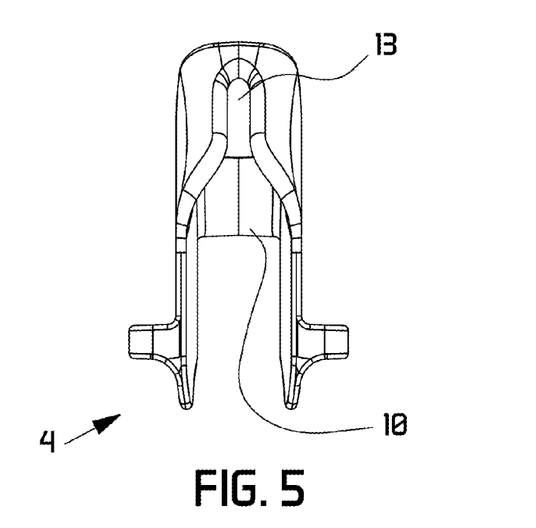
FIG. 5 is a front view of the body of the chain trap.
Figure 6:
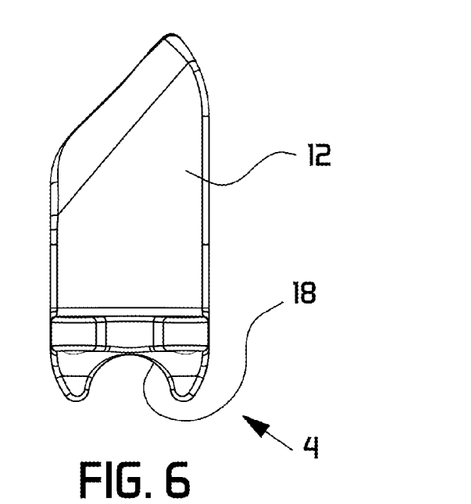
FIG. 6 is a right side view of the body of the chain trap.
Figure 7:
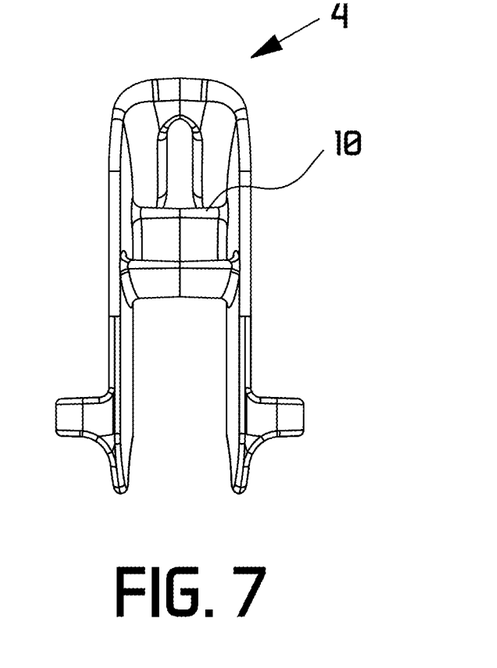
FIG. 7 is a back view of the body of the chain trap.
Figure 8:
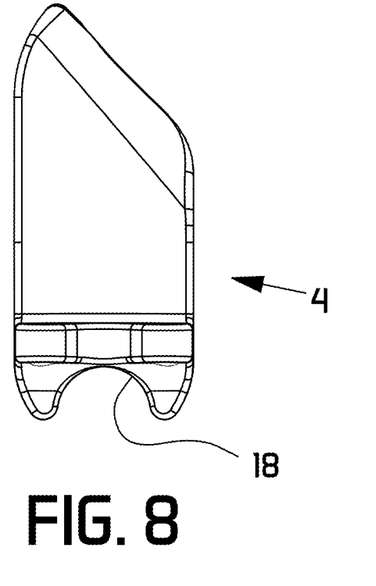
FIG. 8 is a left side view of the body of the chain trap.
Figure 9:
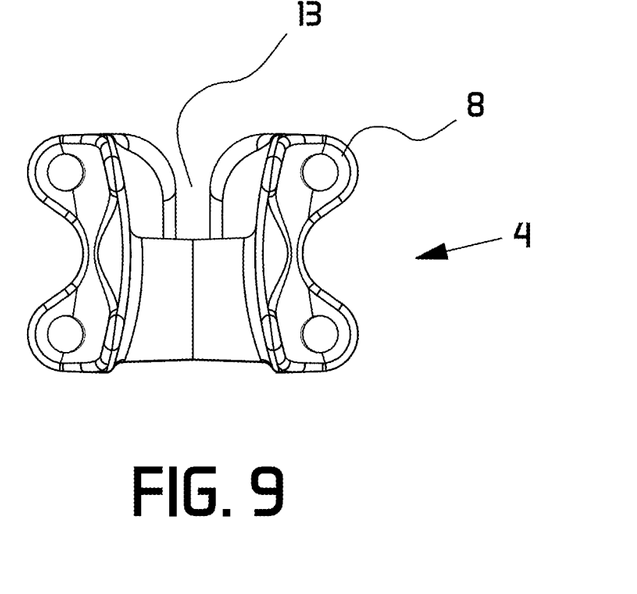
FIG. 9 is a bottom view of the body of the chain trap.

The unitary housing has a fully open bottom (FIGS. 3 and 9), a fully open back (FIG. 7), a fully open front (FIGS. 3 and 5) and a partially open shoulder (FIGS. 4 and 5). The shoulder 16 has an ovate orifice 13 formed there through (FIGS. 5 and 9) where the orifice has its lower end truncated (cut off) and tapered (widened out) that extends to the the fully open front. This results in an ovate opening in the angled shoulder, beginning at the bottom edge of the shoulder where it meets the open front.

From each side of the chain trap 2 and extending from the lower end of its body 4 are two connecting flanges 8. These flanges 8 generally extend normally (horizontally) from the sides 12 and 14 and also the vertical linear axis of the chain trap 2 although various configurations and designs of the flanges 8 would be known by one skilled in the art and may be substituted as such. The purpose of the flanges 8 is to affix various embodiments of the connecting members 6 to the body 4. (Or to one of the alternate embodiment upper bodies with such flanges 6.)

Figure 11:
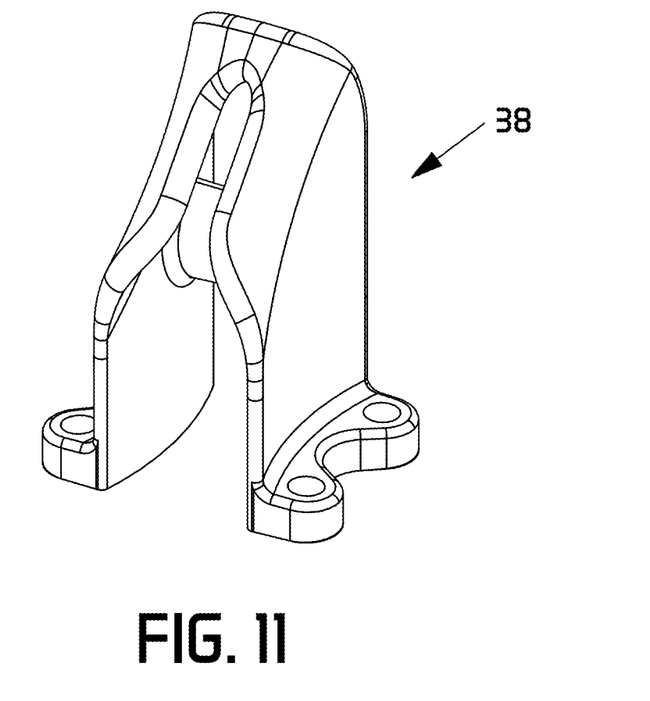
FIG. 11 is a front perspective view of the second alternate embodiment body of the chain trap.

In the preferred embodiment the sides 12 and 14 each have an arc 18 formed on their bottom edge that extends slightly below the bottoms of flanges 8. (FIGS. 6 and 8) This arc 18 accommodates the curve of the barbell 20 which is captured between these arcs 18 and the preferred embodiment connecting member 6. (It is this arc that distinguished the preferred embodiment from the second alternate embodiment of FIG. 11.) In this preferred embodiment the connecting member 6 comprises a "U" bolt and accordingly sized nuts which have been mechanically fastened to the connecting plates 8 around the barbell 20. The preferred embodiment is designed for the specific purpose of spotting weightlifters.

Figure 1:
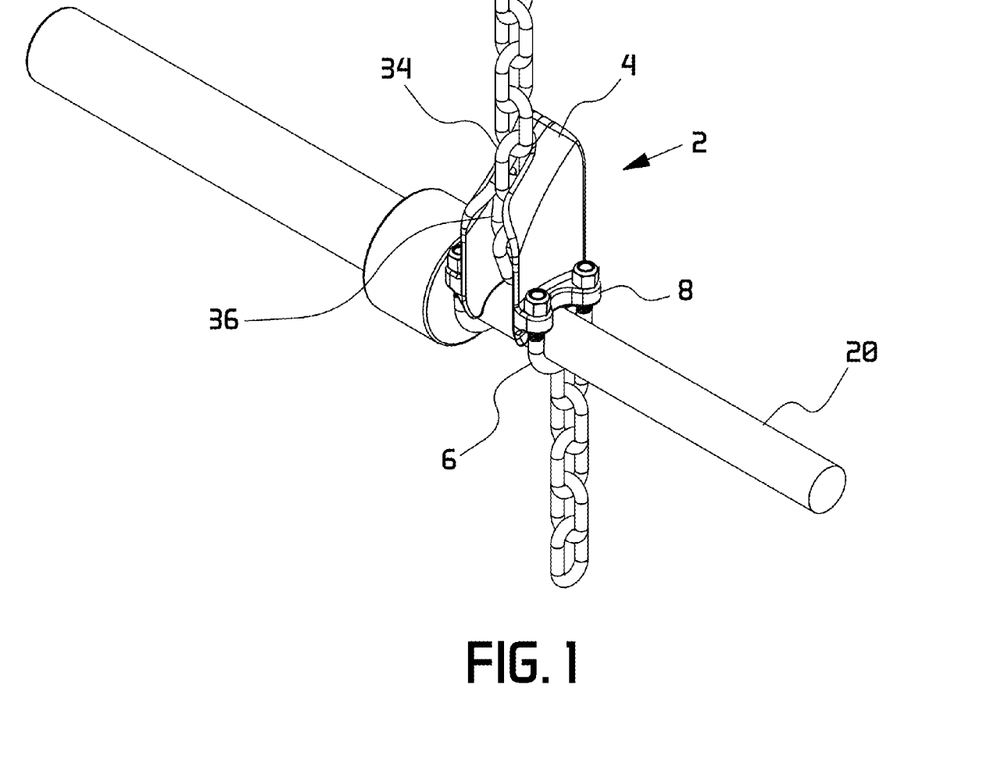
FIG. 1 is a front perspective view of the chain trap engaged with a vertical chain and utilizing a connecting member embodiment adapted for connection to a barbell.
Figure 2:
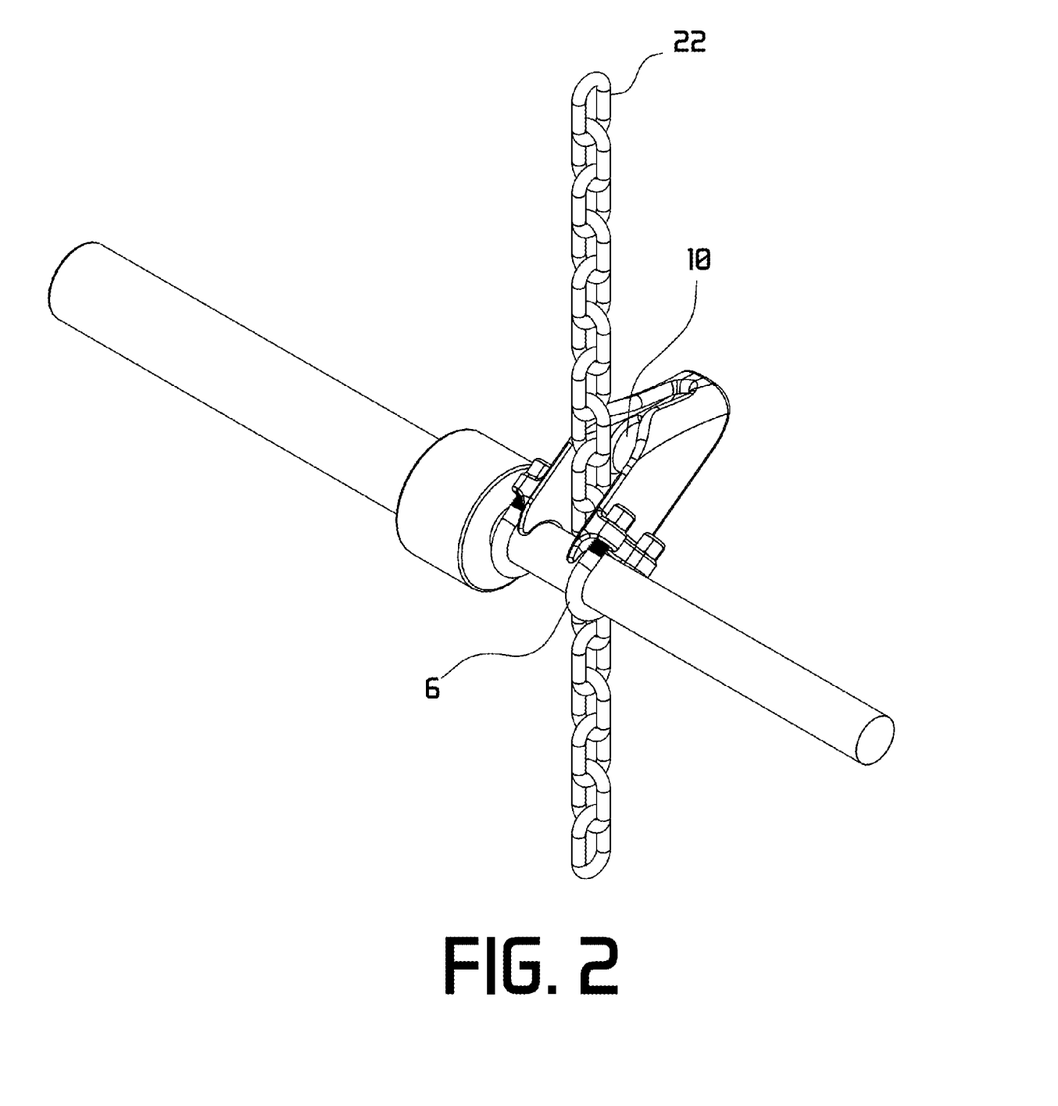
FIG. 2 is a front perspective view of the chain trap disengaged engaged with a vertical chain and utilizing a connecting member embodiment adapted for connection to a barbell.
Figure 3:
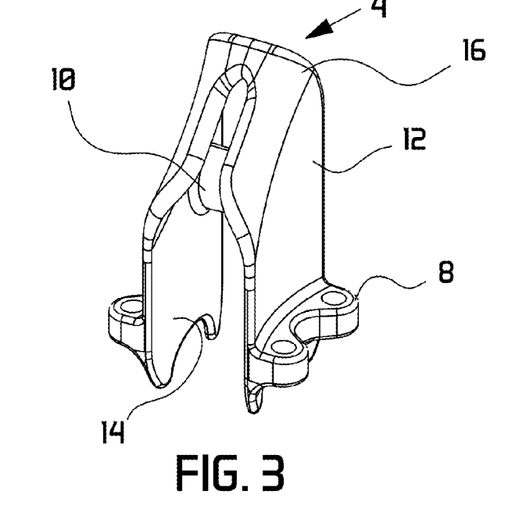
FIG. 3 is a front perspective view of the body of the chain trap.

Looking at FIGS. 1 and 2, the operation of the chain trap 2 can best be explained. With the chain trap 2 tilted backwards from the vertical plane, a chain 22 of a matingly conforming size is fed upward from the open bottom of the chain trap 2, parallel to both of the sides 12 and 14 so as to pass between the front of the guide 10 and the back of the barbell bell 20 to reside in the open front of the body 4. (FIG. 2) When the chain trap 2 is rotated back to a vertical position, an upper link 34 of chain 22 slides into the ovate opening 13 in the shoulder of the body 4 such that the upper link's width resides parallel to the two sides 12 and 14. The lower link 36 is contacted by the guide 10 so as to force the width of the lower link 36 to turn and remain perpendicular to width of the upper link 34 (FIG. 1). This allows the top portion of the lower link 36 to contact the inner face of the shoulder 16. The lower link 36 cannot rotate so as to align with the ovate opening 13 and pass through. This contact at the interface between the lower link 36 and the inner face of the shoulder of the chain trap body 4 sees all the weight of the barbell. Since the width of the chain links is greater than the width of the ovate opening 13, no further chain can pass through the open front of the body 4. (It is to be noted that the guide 10 may be a fully formed cylinder or a partially formed cylindrical shape.)

Because the shoulder 16 angles upward at 50 degrees from the horizontal plane, the lower link 36 is not only trapped in the chain trap 2 but is forced upward toward the rear of the ovate opening 13 (and generally to the rear of the body 4) further preventing the lower link 36 from escaping and potentially passing through the ovate opening 13. Once the load is removed such that the lower link 36 drops below the ovate opening 13 and the body 4 is tilted backwards at an acute angle away from the vertical plane, the lower chain link 36 is free to move downward and forward from its trapped position and pass freely through the open front of the body 4.

Figure 15:
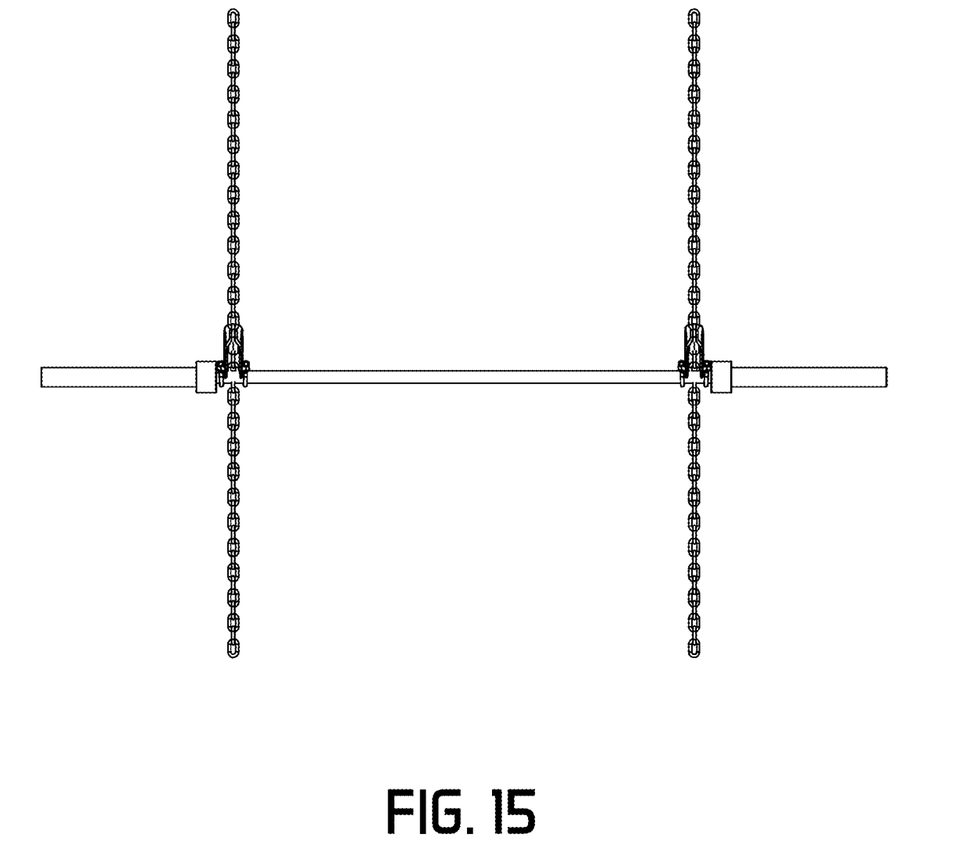
FIG. 15 is a front perspective view of a barbell suspended by two chains engagers with two chain traps.

In operation as an invisible spotter for a weightlifter, the chain trap 2 is affixed to a barbell 20 and a set of two chains affixed to an overhead member hang vertically down from the overhead member through the open front of the body 4. The weightlifter rotates the barbell 20 such that the chain can freely pass through the open front of the body 4 as the barbell is raised an lowered vertically. When securement is needed, the weightlifter need only rotate the barbell 20 with the attached chain trap, to engage the chain links or rings into the chain trap 2, thereby supporting the weight of the barbell. (See FIG. 15)

Figure 10:
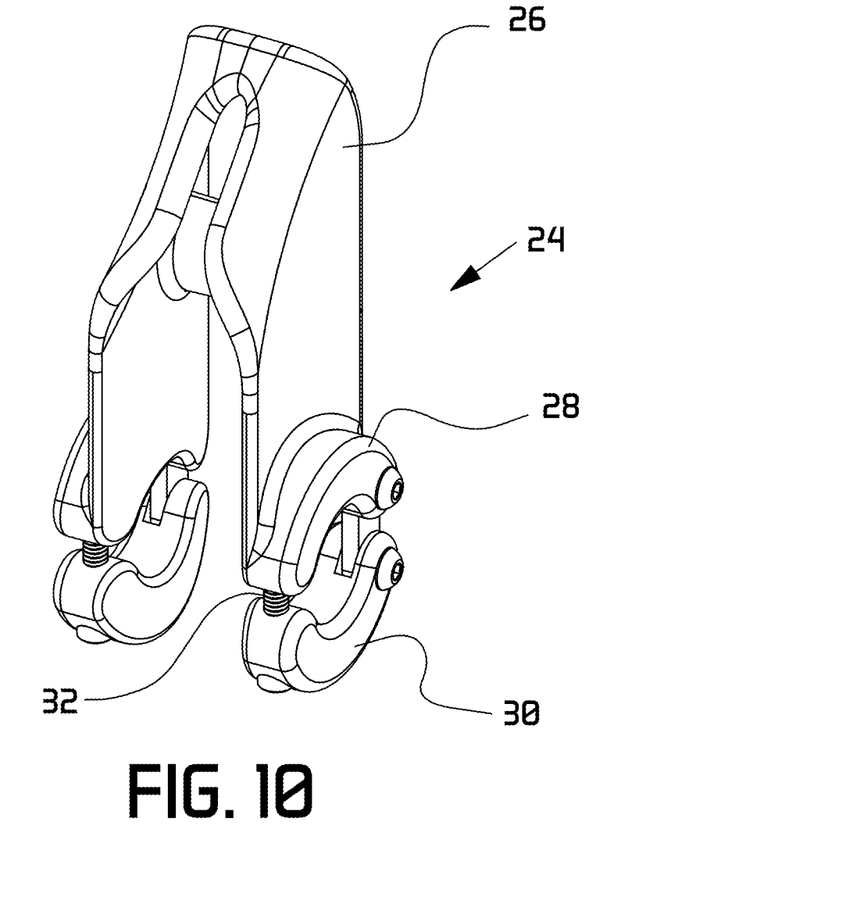
FIG. 10 is a front perspective view of the first alternate embodiment chain trap.

Looking at FIG. 10, the first alternate embodiment chain trap 24 can be seen. This embodiment is also intended for connection to a barbell. Here the body 26 retains all of the elements of the preferred embodiment body 4 except that the flanges 8 have been removed and replaced by the upper threaded half of a circular clamp 28. The first alternate connecting member 30 comprises the lower half of the circular clamp and connects to the body with threaded fasteners 32 so as to encircle bar 20. The first alternate connecting member 30 is pivotally connected at its distal end to the upper threaded half of a circular clamp. This embodiment simplifies connection to a barbell as there is two threaded fasteners per chain trap rather than four as in the preferred embodiment. Other than the difference in attachment of the chain trap to the barbell, the operation of this first alternate embodiment chain trap 24 is undistinguishable from that of the preferred embodiment 2.

The second alternate embodiment trap chain 38 (FIG. 11) is designed for vertical mounting and differs from the preferred embodiment (FIG. 3) by the elimination of the arc 18 at the bottom of the walls 12 and 14. As such the flanges 8 are formed along the bottom edge of each side 12 or 14. This allows for the direct bolting of the body to any flat surface such as the corner of a shipping container and will accommodate vertical lifting with a trapped chain.

Figure 12:
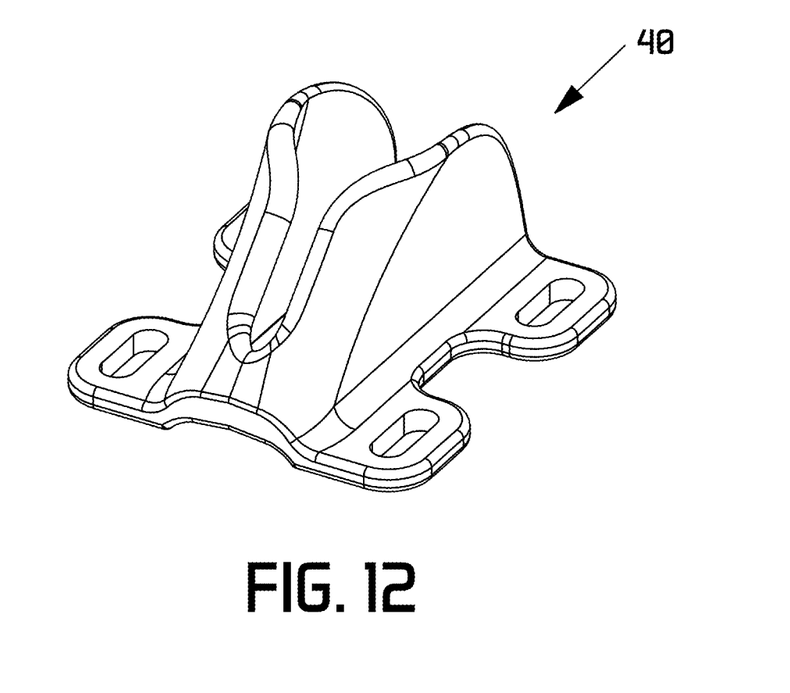
FIG. 12 is a front perspective view of the third alternate embodiment body of the chain trap.

The third alternate embodiment trap chain 40 (FIG. 12) is designed for horizontal mounting for the application of horizontal forces from a trapped chain. It differs from the preferred embodiment only with the elimination of the arcs 18 formed on the bottom edge of each side 12 or 14 and the movement of the flanges 8 from the bottom of the sides 12 and 14 to their back edges. This adds material strength to the third embodiment body 42. (FIGS. 6 and 8) It is to be noted that in the second and third alternate embodiments 38 and 40, their connecting members are not illustrated as they could be threaded fasteners, pins, weld beads or other mechanical fastening devices well known in the art to affix the body of the chain trap to a flat surface (vertical or horizontal) of the article desired to be moved.

Figure 13:
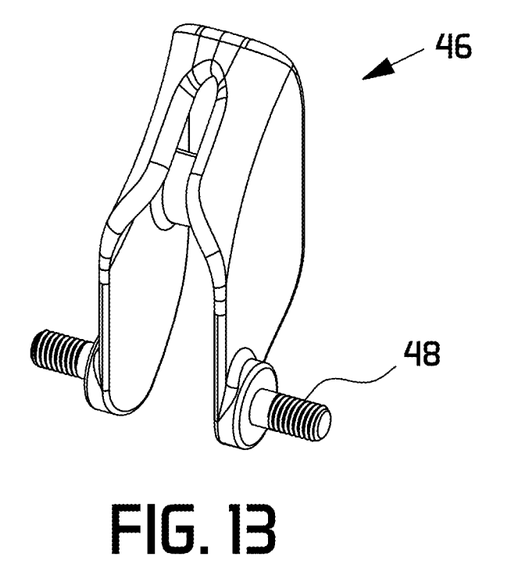
FIG. 13 is a front perspective view of the fourth alternate embodiment body of the chain trap.
Figure 14:
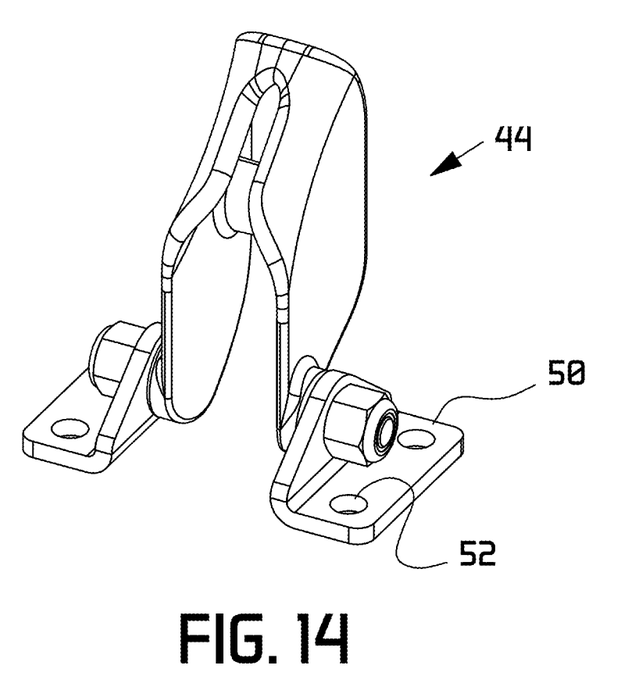
FIG. 14 is a front perspective view of the fourth alternate embodiment chain trap.

FIGS. 13 and 14 illustrate the fourth alternate trap chain 44. The fourth alternate embodiment trap chain body 44 is designed for horizontal or vertical mounting and differs from the preferred embodiment with the elimination of the arcs 18 on sides 12 and 14, the elimination of the flanges 8 formed on the bottom edge of each side 12 or 14 and the substitution of two threaded studs 48 that extend normally therefrom sides 12 and 14.

The fourth embodiment connecting member 50 is a pivotable connecting plate with bolt orifices 52 formed therethrough for the threaded attachment to a load. It is to be noted that the studs 48 lie forward of the linear vertical axis of the catch 46. In this way when there is slack achieved on the chains and the bottom link 36 drops beneath the ovate opening 13 of the shoulder of the catch 44, the off set weight of the catch 44 will cause the catch 44 to tilt backward thus freeing the chain for free, unrestricted vertical movement.

Although disclosed as utilizing threaded mechanical engagement with loads it is well known that other methods of mechanical attachment may be used such as clevises, pins or welding.

Although not disclosed in figures, it is well known that a spring loaded, hingeable connecting member may be incorporated into the chain trap. With this type of arrangement, when the chain is lowered incrementally beyond the point where the load on the chain is reduced to zero, the spring would force the body to tilt away from the vertical plane such that the chain 22 would then be free of the chain trap and could be raised vertically out of the chain trap. With this type of arrangement a load could be craned to its final resting position, set down and then the chains would automatically release allowing the crane to withdraw the chains for further loading without the use of a dock hand. 180 degree placement of the chain traps would ensure that inadvertent releases did not occur.

Although not depicted in the figures, it is envisioned that for secure load lifting and suspension, a locking pin would be inserted through the sides 12 and 14 between the trapped chain 22 and the front opening. This pin could either pass through one of the chain links or press up tight against the lower link of the chain, sandwiching it between this pin and the guide 10 and preventing it from turning 90 degrees or coming loose in the event the tension on the chain were reduced to zero.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A chain trap for releasably retaining a chain for holding or lifting a load comprising:
    a unitary body
    wherein said body has a first side and a second side held in a generally parallel vertical configuration by a chain guide disposed horizontally there between said first side and said second side, and by a shoulder that spans between said first side and said second side; and
    wherein said body has a fully open bottom, a fully open back, and a fully open front; and
    wherein said shoulder has an ovate orifice formed therethrough, said orifice having a lower end truncated and tapered to said open front.

2. The chain trap of claim 1 wherein said first and said second walls are oriented generally vertically.

3. The chain trap of claim 2 wherein said shoulder lies at an acute angle between the horizontal and vertical planes.

4. The chain trap of claim 3 wherein said acute angle is 50 degrees plus or minus 10 degrees with respect to the horizontal plane.

5. The chain trap of claim 1 wherein said chain guide has a circular cross section.

6. The chain trap of claim 1 further comprising:
    a first connecting flange extending normally from said first side; and
    a second connecting flange extending normally from said second side.

\* \* \* \* \*